(12) United States Patent
Tanaka et al.

(10) Patent No.: US 8,491,445 B2
(45) Date of Patent: Jul. 23, 2013

(54) AUTOMATIC CLUTCH CONTROL APPARATUS

(75) Inventors: Masayuki Tanaka, Kariya (JP); Takeshige Miyazaki, Chiryu (JP)

(73) Assignee: Aisin AI Co., Ltd., Nishio-shi (JP)

( * ) Notice: Subject to any disclaimer, the term of this patent is extended or adjusted under 35 U.S.C. 154(b) by 0 days.

(21) Appl. No.: 13/586,264

(22) Filed: Aug. 15, 2012

(65) Prior Publication Data

US 2013/0053217 A1 Feb. 28, 2013

(30) Foreign Application Priority Data

Aug. 24, 2011 (JP) .................................. 2011-182132

(51) Int. Cl.
*B60W 10/02* (2006.01)
*B60W 10/04* (2006.01)

(52) U.S. Cl.
USPC ......................................................... 477/174

(58) Field of Classification Search
USPC ........................... 477/166, 174, 175, 180, 903
See application file for complete search history.

(56) References Cited

U.S. PATENT DOCUMENTS

| 5,301,768 | A * | 4/1994 | Ishikawa et al. ............. 180/249 |
| 6,250,448 | B1 * | 6/2001 | Salecker et al. ........... 192/103 F |
| 6,626,797 | B2 * | 9/2003 | Shiiba et al. ..................... 477/97 |
| 6,634,982 | B2 * | 10/2003 | Miki et al. ....................... 477/45 |
| 7,846,065 | B2 * | 12/2010 | Chen ............................. 477/168 |
| 8,068,963 | B2 * | 11/2011 | Sugiura et al. .................. 701/51 |

FOREIGN PATENT DOCUMENTS

| JP | 9-112589 | 5/1997 |
| JP | 10-318288 | 12/1998 |

* cited by examiner

*Primary Examiner* — Justin Holmes
(74) *Attorney, Agent, or Firm* — Oblon, Spivak, McClelland, Maier & Neustadt, L.L.P.

(57) ABSTRACT

The clutch control apparatus includes a first reference value setting portion for setting a first engagement amount reference value of the first and the second clutches and to obtain a target transmitting torque by calculating a target inertia torque by multiplying a target rotation speed change rate of the engine at a speed change operation by an inertia of the engine and subtracting the target inertia torque from the current output torque of the engine to be the target transmitting torque of the first and the second clutches and a second reference value setting portion for setting a second engagement amount reference value by correcting the first engagement amount reference value based on the vehicle speed and the turning radius.

4 Claims, 5 Drawing Sheets

AUTOMATIC CLUTCH CONTROL APPARATUS

TECHNICAL FIELD

The present invention relates to an automatic clutch control apparatus for controlling an automatic clutch engagement operation upon a vehicle starting/stopping operation and a speed change operation.

BACKGROUND DISCUSSION

A conventional automatic clutch control apparatus discloses a technology in which an engine rotation speed is approximated to the rotation speed of the input shaft of the transmission apparatus for establishing a synchronized rotation therebetween with a predetermined speed change rate to restrain a possible shock generated upon clutch engagement. In this case, change speed of the engine rotation can be controlled by setting a predetermined target clutch transmitting torque. The clutch transmitting torque is variable depending on the clutch engagement ratio (engagement amount) and accordingly, the operation amount of the clutch actuator is controlled to adjust such variable clutch transmitting torque.

For example, according to a conventional apparatus disclosed in JP1998-318288 A, clutch engagement amount reference value is set to obtain a target transmitting torque based on the throttle opening degree and the vehicle speed. According to another conventional apparatus disclosed in JP1997-112589 A, the clutch engagement amount reference value is set to obtain a target transmitting torque based on the throttle opening degree, rotation speed of the driving shaft of the engine and the rotation speed of the input shaft of the transmission apparatus. This target transmitting torque is obtained by first, calculating a target inertia torque which is obtained by multiplying engine inertia by an engine target rotation speed change rate and then subtracting the obtained target inertia torque from the engine current state output torque.

In the conventional automatic clutch control apparatus as described above, the clutch engagement amount reference value is set to obtain the clutch target transmitting torque, based on the information, such as the throttle opening degree, rotation speed of the driving shaft of the engine, the rotation speed of the input shaft of the transmission mechanism and the vehicle speed, but not based on the vehicle condition, such as under the vehicle running straight forward or a vehicle in turning and the speed change (gear shifting) operation is performed based on the clutch engagement reference value. Accordingly, when a speed change operation is performed under the vehicle being turning to right or left or making a winding, an operator of the vehicle may feel susceptibly the clutch engagement operation more than the operator feels when the vehicle is running straight forward.

For example, when a speed change operation is performed under the vehicle being turning to the right or the left, the operator being cautiously driving the vehicle at a low vehicle speed, if the clutch engagement is performed with the same engagement amount reference value as the time when the vehicle is running straight forward, the vehicle behavior such as pitching motion, may be affected due to the change in acceleration in a front and rear direction. Such vehicle behavior may bother the operator of the vehicle, which would not be noticed when the vehicle is running straight forward. The operator of the vehicle may desire to perform a more smooth speed change operation under the vehicle being turning at a low speed, than the vehicle being running straight forward.

Further, when a vehicle is turning at a high speed in sporty as winding and the operator wishes to change the speed by gear shifting, if the clutch engagement is carried out with the same engagement amount as the time when the vehicle is running straight forward, the transmitting torque of the clutch between the driving shaft of the engine and the input shaft of the transmission mechanism becomes smaller than the torque desired by the operator. This may give an ill-effect to the operator of the vehicle due to the insufficient direct feeling of speed change operation. In other words, the operator of the vehicle mostly desires to perform a speed change operation with a more direct feeling when the vehicle is turning at a high speed than when the vehicle is running straight forward.

SUMMARY OF THE INVENTION

The present invention was made considering the above issues and it is an object of the invention to provide an improved automatic clutch control apparatus which enables to satisfy a preference of the operator of the vehicle by providing a good feeling speed change operation depending on the vehicle running condition under the vehicle being turning with the intention of carrying out a speed change operation.

Accordingly, an automatic clutch control apparatus includes a clutch disposed between a driving shaft of a prime mover of a vehicle and an input shaft of a transmission mechanism, a clutch actuator for controlling an engagement/disengagement operation and an engagement amount of the clutch, a vehicle speed detecting means for detecting a vehicle speed of the vehicle, a turning radius detecting means for detecting a turning radius of the vehicle, a first reference value setting portion for setting a first engagement amount reference value of the clutch to obtain a target transmitting torque by calculating a target inertia torque by multiplying an inertia of the prime mover by a target rotation speed change rate of the prime mover at a speed change operation and subtracting a target inertia torque from a current output torque of the prime mover, the value obtained being calculated to be the target transmitting torque of the clutch, a second reference value setting portion for setting a second engagement amount reference value by correcting the first engagement amount reference value based on the vehicle speed and the turning radius and a speed change control portion for issuing a command to the clutch actuator to control the engagement amount of the clutch to set to the first engagement amount reference value when the speed change operation is performed under the vehicle being running straight forward and for issuing a command to the clutch actuator to control the engagement amount of the clutch to set to the second engagement amount reference value when the speed change operation is performed under the vehicle being turning.

BRIEF EXPLANATION OF THE ATTACHED DRAWINGS

The details of the present invention, both as to its structure and operation, can best be understood in reference to the accompanying drawings, in which like reference numerals refer to like parts, and in which.

Figure 7:
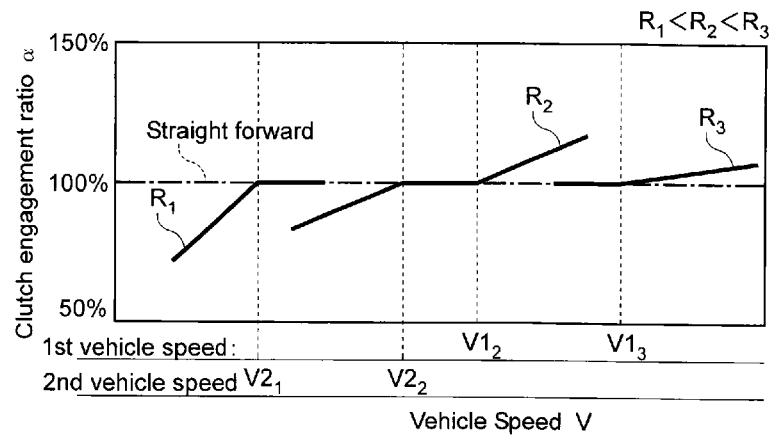
Figure 8:
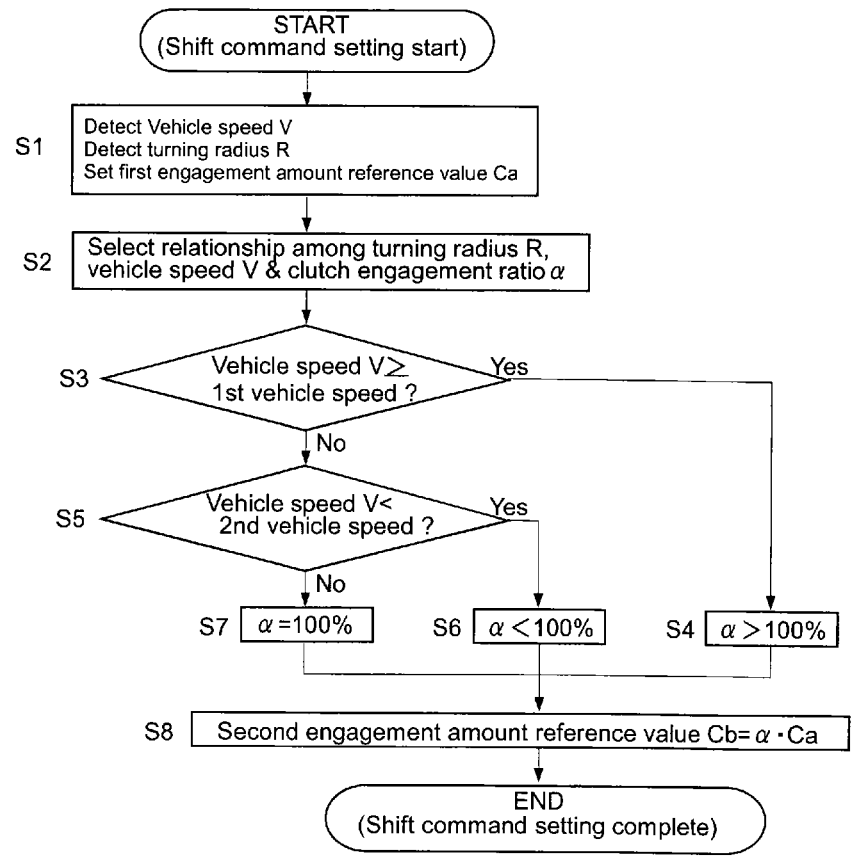

FIG. 7 shows a relationship diagram for setting a second engagement amount reference value according to the automatic clutch control apparatus of the embodiment and showing a relationship between vehicle speed per every turning radius and a clutch engagement ratio; and FIG. 8 is a flowchart showing the setting of the second engagement amount reference value according to the automatic clutch control apparatus.

PREFERRED EMBODIMENTS OF THE INVENTION

An automatic clutch control apparatus 1 according to an embodiment of the invention will be explained with reference to FIGS. 1 through 8. The vehicle used here is of an FF type (front engine, front drive) and is equipped with the automatic clutch control apparatus 1.

Figure 1:
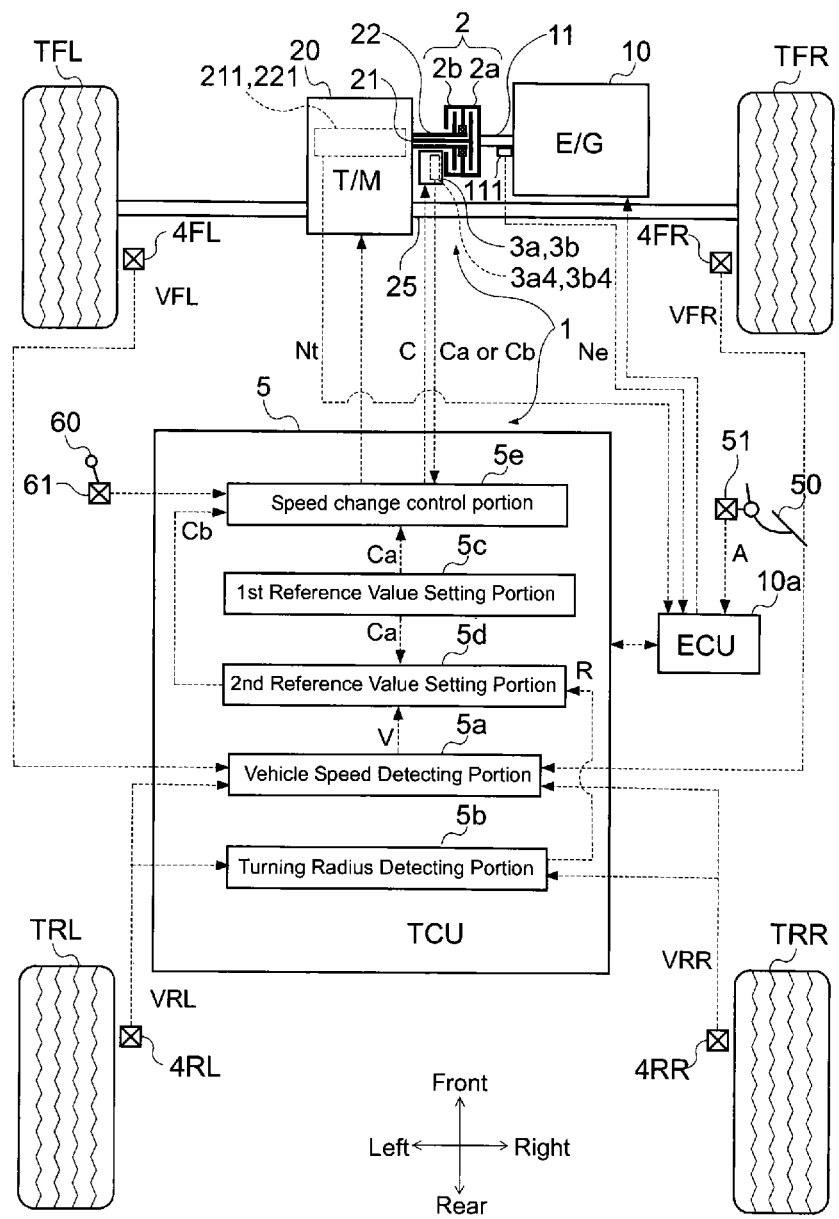
FIG. 1 is a schematic view of a vehicle equipped with an automatic clutch control apparatus according to an embodiment of the invention.

As shown in FIG. 1, in an engine compartment of the vehicle, an engine (prime mover) 10 as a power source and an automatic transmission apparatus 20 (transmission mechanism) are housed. The automatic transmission apparatus 20 includes a dual clutch 2 (clutch) rotationally driven by the engine 10. The rotation driving force of the engine 10 is transmitted to the wheels TFL (front left tire) and TFR (front right tire) through the automatic transmission apparatus 20.

The acceleration pedal depression amount A when an operator of the vehicle depressed an acceleration pedal 50 is detected by a throttle opening degree sensor 51. The ECU 10a (Engine Control Unit) collects the information from the throttle opening degree sensor 51, the various information from TCU 5 (Transmission Control Unit), later explained in detail and the information from the rotation speed sensors 111, 211 and 221. The ECU 10a then controls the engine driving by adjusting the throttle opening degree and fuel injection amount based on the collected vehicle information. The information of the rotation speed Ne of the driving shaft 11 of the engine 10 is detected by the driving shaft rotation speed sensor 111 and outputted to the ECU 10a.

The operator of the vehicle maneuvers a shift lever 60 to select a speed (gear position) of the automatic transmission apparatus 20, which selection is carried out either by manually or automatically. The shift information of the operator's selection of the shift position by the shift lever 60 is detected by a position sensor 61. The TCU 5 and the ECU 10a are connected with each other through CAN (Controller Area Network) to be able to exchange the information therebetween. The speed change control portion 5e of the TCU 5 controls the speed change operation of the automatic transmission apparatus 20 based on the information from the shift position sensor 61, a speed change command from the ECU 10a and the collected various vehicle information. The information of each rotation speed Nt of the input shafts 21 and 22 of the automatic transmission apparatus 20 is detected by the input shaft rotation speed sensors 211 and 221 in the automatic transmission apparatus 20 and is sent to the ECU 10a (shown in FIG. 2).

The automatic clutch control apparatus 1 includes a dual clutch 2 having a first clutch 2a and a second clutch 2b, a first clutch actuator 3a, a second clutch actuator 3b, four vehicle speed sensors 4FL, 4FR, 4RL and 4RR (vehicle speed detecting means and turning radius detecting means), respectively detecting the vehicle wheel speed at the front left wheel TFL, front right wheel TFR, rear left wheel TRL and rear right wheel TRR and the TCU 5.

The TCU 5 includes a vehicle speed detecting portion 5a (vehicle speed detecting means), a turning radius detecting portion 5b (turning radius detecting means), a first reference value setting portion 5c, a second reference value setting portion 5d and a speed change control portion 5e. Operation of the automatic clutch control apparatus 1 will be explained in detail later on and the overall structure of the automatic transmission apparatus 20 will be explained hereinafter with reference to FIGS. 2 and 3.

Figure 2:
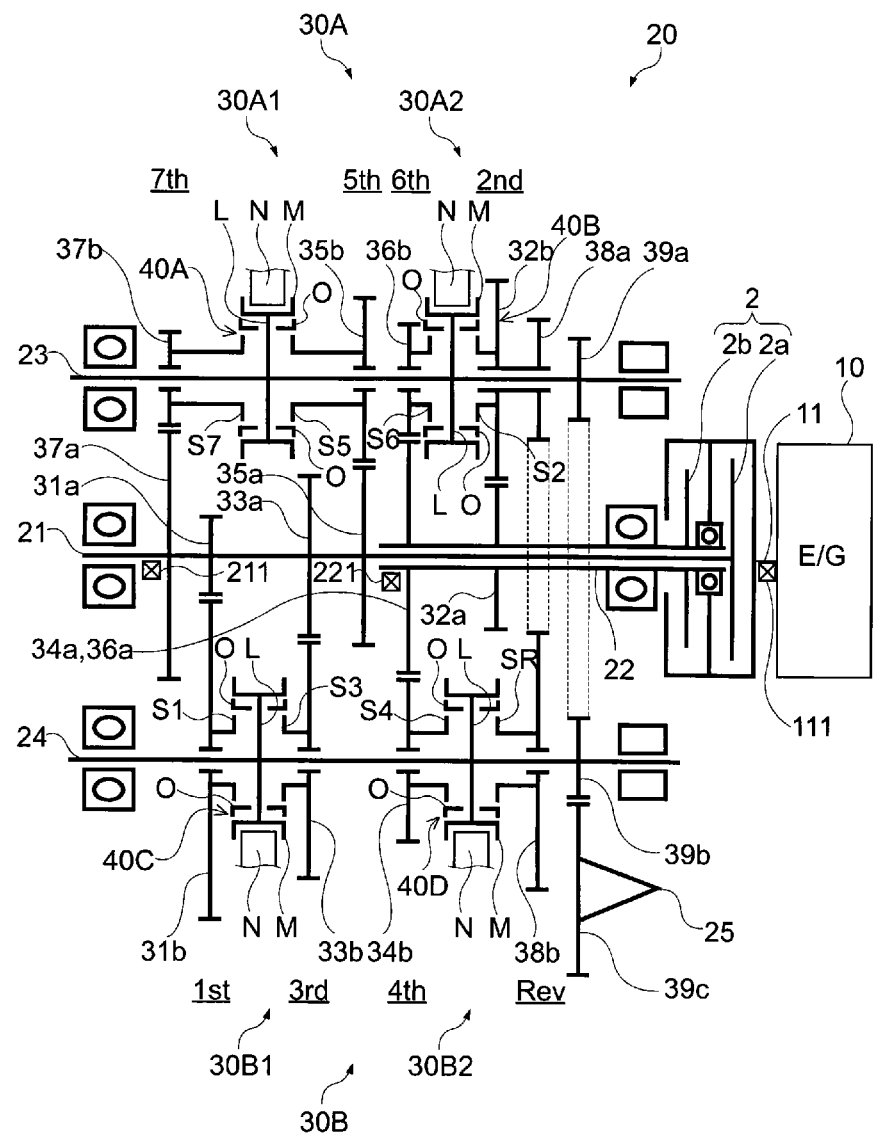
FIG. 2 is a skeleton view of an overall structure of the dual clutch type automatic transmission apparatus equipped with the automatic clutch control apparatus according to the embodiment of the invention.

As shown in FIG. 2, the automatic transmission apparatus 20 is of a dual clutch type automatic transmission (DCT) for FF type vehicle with seven forward speeds and one reverse speed. The automatic transmission apparatus 20 includes a rotation shafts supported on a transmission case (not shown), which are first input shaft 21 second input shaft 22, first countershaft 23, second countershaft 24 and an output shaft 25.

The automatic transmission apparatus 20 includes a first gear wheel shift unit 30A1 and a third gear wheel shift unit 30B1 which correspond to the first shift mechanism for establishing odd number speeds by changing the rotation speed (rotation driving force) of the engine 10 transmitted to the first input shaft 21 and a second gear wheel shift unit 30A2 and a fourth gear wheel shift unit 30B2 which correspond to the second shift mechanism for establishing even number speeds by changing the rotation speed (rotation driving force) of the engine 10 transmitted to the second input shaft 22.

The second input shaft 22 is formed of cylindrical shape and coaxially encloses the first input shaft 21 for relative rotation therebetween. It is noted that the vehicle left side end of the first input shaft 21 (left side as viewed in FIG. 2) projects beyond the left side end of the second input shaft 22 in a vehicle left side direction. The first countershaft 23, the second countershaft 24 and the output shaft 25 are arranged in parallel with the first and the second input shafts 21 and 22.

The dual clutch 2 which is driven by the driving shaft 11 of the engine 10 is arranged at the right side of the automatic transmission apparatus 20 and at the vehicle right side (right side in FIG. 2). The dual clutch 2 is of a normal open type in which the engagement of the clutch is in released condition while the vehicle is stopped under the engine 10 being stopped or being activated.

The dual clutch 2 includes a first clutch 2a and a second clutch 2b, both being a friction type clutch. The first and the second clutches are respectively connected to the driving shaft 11 of the engine 10. The first clutch 2a is connected to the first input shaft 21 and the second clutch 2b is connected to the second input shaft 22.

Figure 3:
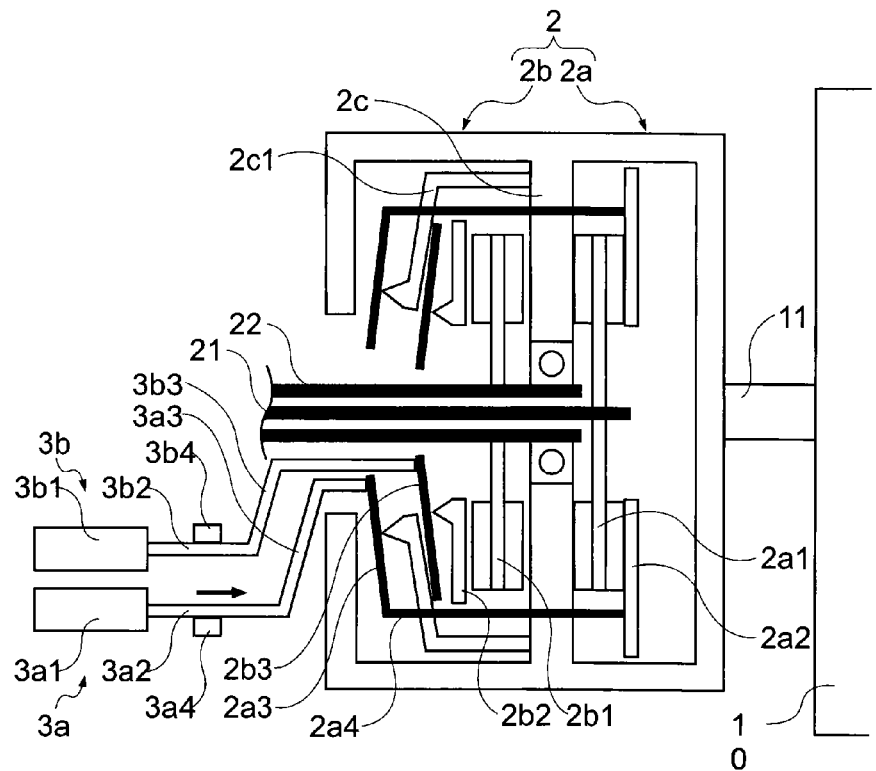
FIG. 3 is a schematic cross sectional view of a dual clutch of the automatic clutch control apparatus according to the embodiment of the invention, showing the first clutch being in engaged condition.

The dual clutch 2 becomes in an operative condition in which the first clutch 1a is engaged while the second clutch 2b is disengaged as viewed in FIG. 3, in another operative condition in which the second clutch 2b is engaged while the first clutch 2a is disengaged and in an inoperative condition in which both first and the second clutches 2a and 2b are disengaged depending on the command received from the speed change control portion 5e of the TCU 5.

The first clutch actuator 3a controls the engagement and disengagement of the first clutch 2a and the engagement amount C thereof based upon a command from the speed change control portion 5e of the TCU 5 and the rotation driving force from the engine 10 is transmitted to the first input shaft 21 during the clutch engagement condition as viewed in FIG. 3. Further, the second clutch actuator 3b controls the engagement and disengagement of the second clutch 2b and the engagement amount C thereof based upon a command from the speed change control portion 5e of the TCU 5 and the rotation driving force from the engine 10 is transmitted to the second input shaft 22 during the clutch engagement condition.

The detail structure of the dual clutch 2 will be explained hereinafter with reference to FIG. 3. The dual clutch 2 includes a first and a second clutch disc 2a1 and 2b1, center plate 2c, a first and a second pressure plate 2a2 and 2b2 and a first and a second diaphragm spring 2a3 and 2b3.

The first clutch disc 2a1 transmits the rotation driving force of the engine to the first input shaft 21 and the second clutch disc 2b1 transmits the rotation driving force of the engine to the second input shaft 22. The first clutch disc 2a1 is in spline connection with the connection portion of the first input shaft 21 for freely movable thereon in an axial direction of the input shaft and the second clutch disc 2b1 is in spline connection with the connection portion of the second input shaft 22 for freely movable thereon in an axial direction of the input shaft.

The center plate 2c is disposed between the first clutch disc 2a1 and the second clutch disc 2b1 and each side surface of the center plate 2c faces corresponding side surface of the first and the second clutch discs 2a1 and 2b1 in parallel relation with one another. The center plate 2c is disposed in the second input shaft 22 via a bearing for relative rotation therewith and is connected to the driving shaft 11 of the engine 10 for unitary rotation therewith.

The first and the second pressure plates 2a2 and 2b2 respectively support the first and the second clutch discs 2a1 and 2b1 with the center plate 2c to be in pressure contact therewith.

The first and the second diaphragm springs 2a3 and 2b3 are formed to be of circular ring shape and the first diaphragm spring 2a3 is arranged opposite to the first pressure plate 2a2 in the axial direction of the input shaft with respect to the center plate 2c. The outer diameter portion of the first diaphragm spring 2a3 and the first pressure plate 2a2 are connected through a cylindrical connecting portion 2a4. The first diaphragm spring 2a3 is supported at a tip end portion of an arm portion 2c1 extending from the center plate 2c.

Under this condition, when the outer diameter portion of the first diaphragm spring 2a3 urges the connecting portion 2a4 in an engine direction with a spring force, the first pressure plate 2a2 is separated from the first clutch disc 2a1.

Further, when the inner diameter portion of the first diaphragm spring 2a3 is pressurized in an engine direction, the spring force of the outer diameter portion of the first diaphragm spring 2a3 urging towards the engine direction is decreased. Then the outer diameter portion of the first diaphragm spring 2a3 pivotally moves in the direction opposite to the engine 10 about the tip end of the arm portion 2c1 extending from the center plate 2c as a fulcrum point. Thus, the first pressure plate 2a2 moves towards the first clutch disc 2a1 and then pressurizes the first clutch disc 2a1 with the center plate 2c until the first clutch disc 2a1 completely engages. Thus the rotation driving force from the engine 10 is transmitted to the first input shaft 21 through the clutch engagement (See FIG. 3).

The second diaphragm spring 2b3 is arranged at the engine 10 side of the arm portion 2c1 of the center plate 2c and is arranged at the opposite side to the second clutch disc 2b1 in an axial direction of the input shaft with respect to the second pressure plate 2b2. The outer diameter portion of the second diaphragm spring 2b3 is arranged so that the spring force thereof urges the arm portion 2c1 in the transmission apparatus 20 direction. Accordingly, under normal condition, the second pressure plate 2b2 and the second clutch disc 2b1 are not in pressure contact with each other (See FIG. 3).

When the inner diameter portion of the second diaphragm spring 2b3 is pressurized towards the engine 10, the vicinity of the pressing portion moves towards the engine 10 pivoting about the outer diameter portion of the second diaphragm spring 2b3 which is in contact with the arm portion 2c1 as a fulcrum point. The second pressure plate 2b2 is then pressurized by the second diaphragm spring 2b3 and moves towards the second clutch disc 2b1. Finally, the second clutch disc 2b1 is pressurized between the center plate 2c and the second pressure plate 2b2 to complete the clutch engagement to transmit the rotation driving force from the engine 10 to the second input shaft 22.

The inner diameter portion of the first diaphragm spring 2a3 and the inner diameter portion of the second diaphragm spring 2b3 are pressurized by the first and the second clutch actuators 3a and 3b, respectively. The first and the second clutch actuators 2a and 3b respectively include a DC electric motor 3a1 and 3b1, a ball-screw structured rod 3a2 and 3b2 making a straight line motion actuated by the DC motor 3a1 and 3b1, a transmitting portion 3a3 and 3b3 for transmitting the straight line motion of the rod 3a2 and 3b2 to the inner diameter portion of the first and the second diaphragm spring 2a3 and 2b3 and a stroke sensor 3a4 and 3b4 for detecting the stroke amount of the straight line motion of the rod 3a2 and 3b2.

The information on the stroke amount of straight line motion of the rod 3a2 and 3b2 detected by the stroke sensor 3a4 and 3b4 (information on the engagement amount C) is sent to the speed change control portion 5e of the TCU 5 as shown in FIG. 1.

As shown in FIG. 2, the automatic transmission apparatus 20 includes a first gear wheel speed change mechanism 30A provided between the first input shaft 21 or the second input shaft 22 and the first countershaft 23, a second gear wheel speed change mechanism 30B provided between the first input shaft 21 or the second input shaft 22 and the second countershaft 24, a first reduction gear train 39a and 39c for connecting the first countershaft 23 with the output shaft 25 and a second reduction gear train 39b and 39c for connecting the second countershaft 24 with the output shaft 25.

The first gear wheel speed change mechanism 30A includes a first gear wheel shift unit 30A1 (first shift mechanism) provided between the first input shaft 21 and the first countershaft 23 and a second gear wheel shift unit 30A2 (second shift mechanism) provided between the second input shaft 22 and the first countershaft 23.

The first gear wheel shift unit 30A1 is formed by a seventh speed gear train 37a and 37b, a fifth speed gear train 35a and 35b and a first shift clutch 40A. The seventh speed gear train 37a and 37b is formed by a seventh speed drive gear 37a fixed to the first input shaft 21 and a seventh speed driven gear 37 freely rotatably mounted on the first countershaft 23. The fifth speed gear train 35a and 35b is formed by a fifth speed drive gear 35a fixed to the first input shaft 21 and a fifth speed driven gear 35b freely rotatably mounted on the first countershaft 23.

The first shift clutch 40A includes a clutch hub L, a seventh speed engagement member S7, a fifth speed engagement member S5, synchronizer ring O and a sleeve M. The clutch hub L is connected to the first countershaft 23 in spline connection therewith between the seventh speed driven gear 37b and the fifth speed driven gear 35b in an axial direction. The seventh speed engagement member S7 and the fifth speed engagement member S5 are respectively fixed to the seventh speed driven gear 37b and the fifth speed driven gear 35b by means of press-fit or the like. Synchronizer ring O is disposed between the clutch hub L and each engagement member S7 and S5 both sides in an axial direction. The sleeve M is in spline connection with the outer peripheral surface of the clutch hub L and freely movable thereon in an axial direction.

The first shift clutch 40A enables the engagement between one of the seventh speed driven gear 37b and the fifth speed driven gear 35b and the first countershaft 23 and includes a well-known synchromesh mechanism disengages both of the seventh speed driven gear 37b and the fifth speed driven gear 35b from the first countershaft 23.

The sleeve M of the first shift clutch 40A is not engaged with any of the engagement members S7 and S5 under the neutral position. When the shift fork N is operated to have the sleeve M to be shifted to the seventh speed side driven gear 37b, the sleeve M is engaged with the spline portion of the synchronizer ring O at this side to synchronize the rotation speed between the first countershaft 23 and the seventh speed driven gear 37b and then engages with an external geared spline of the outer peripheral surface of the seventh speed engagement member S7 to establish the seventh speed. When the shift fork N is operated to have the sleeve M shifted to the fifth speed side driven gear 35b, the rotation speed of both first countershaft 23 and the fifth speed driven gear 35b are synchronized for unitary rotation to thereby establish the fifth speed.

The second gear wheel shift unit 30A2 is formed by the sixth speed gear train 36a and 36b, the second speed gear train 32a and 32b, a reverse speed drive gear 38a and the second shift clutch 40B. The sixth speed gear train 36a and 36b is formed by the sixth speed drive gear 36a fixed to the second input shaft 22 and the sixth speed driven gear 36b freely rotatably mounted on the first countershaft 23. The second speed gear train 32a and 32b is formed by the second speed drive gear 32a fixed to the second input shaft 22 and the second speed driven gear 32b freely rotatably mounted on the first countershaft 23.

The reverse speed drive gear 38a is formed integrally with the second speed driven gear 32b and positions more vehicle right side (right side in FIG. 2) than the position of the second speed driven gear 32b. The reverse speed drive gear 38a is freely rotatably mounted on the first countershaft 23 and engages with the reverse speed driven gear 38b which is freely rotatably mounted on the second countershaft 24.

The second shift clutch 40B has a similar structure as the first shift clutch 40A, except that the sixth speed engagement member S6 and the second speed engagement member S2 of the second shift clutch 40B are respectively fixed to the sixth speed driven gear 36b and the second speed driven gear 32b. Similar to the first shift clutch 40A, this second shift clutch 40B also forms a well-known synchromesh mechanism.

The second shift clutch 40B establishes the sixth speed and the second speed as similar to the establishing of the seventh speed and the fifth speed of the first shift clutch 40A and the explanation of detail operation thereof is omitted.

The second gear wheel speed change mechanism 30B is formed by the third gear wheel shift unit 30B1 (first shift mechanism) provided between the first input shaft 21 and the second countershaft 24 and the fourth gear wheel shift unit 30B2 (second shift mechanism) provided between the second input shaft 22 and the second countershaft 24.

The third gear wheel shift unit 30B1 includes a first speed gear train 31a and 31b, a third speed gear train 33a and 33b and a third shift clutch 40C. The first speed gear train 31a and 31b is formed by a first speed drive gear 31a fixed to the first input shaft 21 and a first speed driven gear 31b freely rotatably mounted on the second countershaft 24. The third speed gear train 33a and 33b is formed by a third speed drive gear 33a fixed to the first input shaft 21 and a third speed driven gear 33b freely rotatably mounted on the second countershaft 24.

The third shift clutch 40C has substantially the same structure as that of the first shift clutch 40A, except that the first speed engagement member S1 and the third speed engagement member S3 of the third shift clutch 40C are respectively fixed to the first speed driven gear 31b and the third speed driven gear 33b. This third shift clutch 40C forms a well-known synchromesh mechanism as same as the first shift clutch 40A.

The third shift clutch 40C establishes the first speed and the third speed and the operation thereof is similar to the establishment of the seventh and fifth speeds by the first shift clutch 40A and therefore, the detail explanation thereof is omitted.

The fourth gear wheel shift unit 30B2 is formed by a fourth speed gear train 34a and 34b, a reverse speed driven gear 38b and the fourth shift clutch 40D. The fourth speed gear train 34a and 34b is formed by a fourth speed drive gear 34a (commonly used with the sixth speed drive gear 36a) fixed to the second input shaft 22 and a fourth speed driven gear 34b freely rotatably mounted on the second countershaft 24. The reverse speed driven gear 38b is mounted on the second countershaft 24 and freely rotatable thereon.

The fourth shift clutch 40D has substantially the same structure as that of the first shift clutch 40A except that the fourth speed engagement member S4 and the reverse speed engagement member SR of the fourth shift clutch 40D are respectively fixed to the fourth speed driven gear 34b and the reverse speed driven gear 38b. This fourth shift clutch 40D forms a well-known synchromesh mechanism as same as the first shift clutch 40A.

The fourth shift clutch 40D establishes the fourth speed and the reverse speed and the operation thereof is similar to the establishment of the seventh and fifth speeds by the first shift clutch 40A and therefore, the detail explanation thereof is omitted Next, the operation of the automatic transmission apparatus 20 will be explained. The first and the second gear wheel speed change mechanisms 30A and 30B and the dual clutch 2 are operated upon receipt of a command from the speed change control portion 5e of the TCU in response to the vehicle running condition, such as a throttle opening degree A, the rotation speed Ne of the driving shaft 11 of the engine, rotation speed Nt of the first and the second input shafts 21 and 22 of the automatic transmission apparatus 20 and the vehicle speed V. Under the non-operation condition, the first through fourth shift clutches 40A through 40D of the first and the second gear wheel speed change mechanisms 30A and 30B are in neutral position and the first and the second clutches 2a and 2b of the dual clutch 2 are released.

Under the vehicle being stopped, when the engine 10 is started, the above non-operation condition is maintained. After the engine being started under the vehicle being stopped, if the automatic transmission apparatus 20 is operated to shift the shift lever 60 to a forward speed position, the speed change control portion 5e of the TCU issues a command to the automatic transmission apparatus 20 to engage the first speed engagement member S1 of the third shift clutch 40C to thereby connect the second countershaft 24 and the first speed driven gear 31b for unitary rotation and thereby establishing the first speed. In this situation, the other clutches 40A, 40B and 40D are kept in neutral position.

Under this condition, when the throttle opening degree A increases and the rotation speed of the driving shaft 11 of the engine 10 exceeds a predetermined value, the speed change control portion 5e of the TCU 5 issues a command to the first clutch actuator 3a to gradually increase the engagement amount C of the first clutch 2a of the dual clutch 2 in response to the increase of the throttle opening degree A, thereby to gradually increase the engagement force (clutch transmitting torque Tc). Thus the driving torque (current output torque Te) of the driving shaft 11 is transmitted to the output shaft 25 from the first clutch 2a through the first input shaft 21, first speed gear train 31a and 31b, first speed engagement member S1 of the third shift clutch 40C, second countershaft 24 and the second reduction gear train 39b and 39c. Thus the vehicle starts running forward with the first speed.

When the throttle opening degree A increases and the vehicle running condition becomes appropriate to run with the second speed, the speed change control portion 5e of the TCU 5 issues a command to the automatic transmission apparatus 20 to engage the second speed engagement member S2 of the second shift clutch 40B to connect the first countershaft 23 and the second speed driven gear 32b for unitary rotation to establish the second speed. Thereafter, the TCU 5 issues a command to shift the dual clutch 2 from the first clutch 2a side to the second clutch 2b side and then the third shift clutch 40C is shifted to the neutral position upon receipt of a command from the TCU 5.

The driving torque (current output torque Te) of the driving shaft 11 is then transmitted to the output shaft 25 from the second clutch 2b through the second input shaft 22, the second speed gear train 32a and 32b, the second speed engagement member S2 of the second shift clutch 40B, the first countershaft 23 and the first reduction gear train 39a and 39c. The vehicle then changes the speed from the first to the second.

Similarly, the TCU 5 selects one of the third to seventh speed depending on the vehicle running condition and at the same time alternately selects the engagement of the first and the second clutches 2a and 2b to thereby control the automatic transmission apparatus 20 so that the vehicle can drive with a suitable speed in response to the driving condition of the vehicle.

After the engine being started and the vehicle is stopped, if the shift lever 60 is shifted to the reverse speed position, the speed change control portion 5e of the TCU issues a command to the automatic transmission apparatus 20 to engage the reverse speed engagement member SR of the fourth shift clutch 40D to connect the second countershaft 24 with the reverse speed driven gear 38b to establish the reverse speed. The other shift clutches 40A, 40B and 40C are respectively in neutral position.

Under this condition, when the throttle opening degree A increases and exceeds a predetermined value, the speed change control portion 5e of the TCU 5 issues a command to the second clutch actuator 3b to gradually increase the engagement amount C of the second clutch 2b of the dual clutch 2 in response to the increase of the throttle opening degree A, thereby to gradually increase the engagement force (clutch transmitting torque Tc). Thus the driving torque (current output torque Te) of the driving shaft 11 is transmitted to the output shaft 25 from the second clutch 2b through the second input shaft 22, second speed gear train 32a and 32b, reverse speed gear train 38a and 38b, the reverse speed engagement member SR of the fourth shift clutch 40D, second countershaft 24 and the second reduction gear train 39b and 39c. Thus the vehicle starts moving rearward with the reverse speed.

Under the vehicle stopping condition, where the first and the second clutches 2a and 2b are disengaged, when the shift lever 60 of the automatic transmission apparatus 20 is shifted to the parking position, the speed change control portion 5e of the TCU 5 issues a command to the automatic transmission apparatus 20 to engage the second speed engagement member S2 of the second shift clutch 40B and at the same time to engage the reverse speed engagement member SR of the fourth shift clutch 40D.

By the engagement of the second speed engagement member S2, rotation in one direction torque transmission path is established, which transmits the rotation torque in one rotational direction from the second input shaft 22 to the output shaft 25 through second speed gear train 32a and 32b, second speed engagement member S2 of the second shift clutch 40B, first countershaft 23 and first reduction gear train 39a and 39c. On the other hand, by the engagement of the reverse speed engagement member SR, the rotation in the other rotational direction torque transmission path is established, which transmits the rotation torque in the other rotational direction from the second input shaft 22 to the output shaft 25 through second speed gear train 32a and 32b, reverse speed gear train 38a and 38b, reverse speed engagement member SR of the fourth shift clutch 40D, second countershaft 24 and second reduction gear train 39b and 39c.

Accordingly, the parking position can be locked by the double engagement operation, one engagement between the second speed gear train 32a and 32b and the first reduction gear train 39a and 39c and the other engagement between the reverse speed gear train 38a and 38b and the second reduction gear train 39b and 39c.

Next, operation of the automatic clutch control apparatus 1 will be explained. As explained above, the first and the second clutches 2a and 2b of the dual clutch 2 are operated according to the vehicle running condition such as throttle opening degree A, the rotation speed Ne of the driving shaft 11 of the engine 10, rotation speed Nt of the first and the second input shafts 21 and 22 of the automatic transmission apparatus 20 and vehicle speed V under the command from the speed change control portion 5e of the TCU 5.

In the automatic clutch apparatus 1 according to the embodiment, when a speed of the vehicle is changed to another during the vehicle being running straight forward, the first engagement amount reference value Ca is controlled to be the reference value of the engagement amount C of the first and the second clutches 2a and 2b of the dual clutch 2. When the speed of the vehicle is changed to another during the vehicle being turning the second engagement amount reference value Cb is controlled to be the reference value of the engagement amount C of the first and the second clutches 2a and 2b of the dual clutch 2. The second engagement amount reference value Cb is defined by correcting the first engagement amount reference value Ca based on the vehicle speed V and the turning radius R of the vehicle.

The controlling operation of the dual clutch 2 by the second engagement amount reference value Cb defined by correcting the first engagement amount reference value Ca will be explained hereinafter with the assumption that the automatic transmission apparatus 20 is operated to change speed during the vehicle being turning.

As explained above, the TCU 5 of the automatic clutch control apparatus 1 includes a vehicle speed detecting portion 5a, a turning radius detecting portion 5b, first reference value setting portion 5c, second reference value setting portion 5d and the speed change control portion 5e. (See FIG. 1)

The information on the vehicle wheel speed VFL of the front left wheel TFL detected by the front left wheel vehicle speed sensor 4FL (vehicle speed detecting means), the vehicle wheel speed VFR of the front right wheel TFR detected by the front right wheel vehicle speed sensor 4FR (vehicle speed detecting means), the vehicle wheel speed VRL of the rear left wheel TRL detected by the rear left wheel vehicle speed sensor 4RL (vehicle speed detecting means) and the vehicle wheel speed VRR of the rear right wheel TRR detected by the rear right wheel vehicle speed sensor 4RR (vehicle speed detecting means) is sent to the vehicle speed detecting portion 5a (vehicle speed detecting means). The vehicle speed V is calculated at the vehicle speed detecting portion 5a by averaging the collected vehicle wheel speeds VFL, VFR, VRL and VRR.

The information on the vehicle wheel speed VRL of the rear left wheel TRL detected by the rear left wheel vehicle speed sensor 4RL (turning radius detecting means) and the vehicle wheel speed VRR of the rear right wheel TRR detected by the rear right wheel vehicle speed sensor 4RR ((turning radius detecting means) is sent to the (turning radius detecting portion 5b ((turning radius detecting means). The turning radius R is calculated at the turning radius detecting portion 5b by the difference between the vehicle wheel speed VRL of the rear left wheel TRL and the vehicle wheel speed VRR of the rear right wheel TRR.

The first reference value setting portion 5c determines the first engagement mount reference value Ca as follows: First, the target transmitting torque Tca is calculated according to the mathematical formula [M1]. This target transmitting torque Tca is a reference transmitting torque which is applied as a reference torque to control the transmitting torque Tc of the clutch to minimize speed change shocks generated upon shift-up operation, when the lower speed side clutch is disengaged and the higher speed side clutch is engaged, or upon the shift-down operation, when the higher speed side clutch is disengaged and the lower speed side clutch is engaged.

$$Tca = Te - (Ie \cdot \Delta Nea) \quad [M1]$$

Wherein,
Tca: Target transmitting torque,
Te: Current output torque
Ie: Inertia
ΔNea: Target rotation speed change rate The first reference value setting portion 5c first, calculates the target inertia torque "Ie·ΔNea" by multiplying inertia "Ie" (moment of inertia, or moment of inertia ratio) of the engine 10 by target rotation speed change rate "ΔNea". This target inertia torque "Ie·ΔNea" corresponds to deceleration or acceleration torque to be transmitted to the driving shaft 11 of the engine 10 from the first and the second clutches 2a and 2b to suitably change (accelerate or decelerate) the rotation speed "Ne" of the driving shaft 11 of the engine 10.

The target rotation speed change rate "ΔNea" is a well-known value predetermined as the speed change rate of the engine rotation speed "Ne". By controlling the speed change so that the rotation speed "Ne" of the driving shaft 11 of the engine 10 approximates the target rotation speed change rate "ΔNea" to perform a quick speed change operation and to minimize the speed change shock.

Next, the first reference value setting portion 5c calculates the target transmitting torque "Tca" by subtracting the target inertia torque "Ie·ΔNea" from the current output torque Te of the engine 10. This "current output torque Te" may be calculated based on the detected values, such as rotation speed Ne of the driving shaft 11 of the engine 10 or the throttle opening degree A and the output torque performance of the engine 10.

Figure 4:
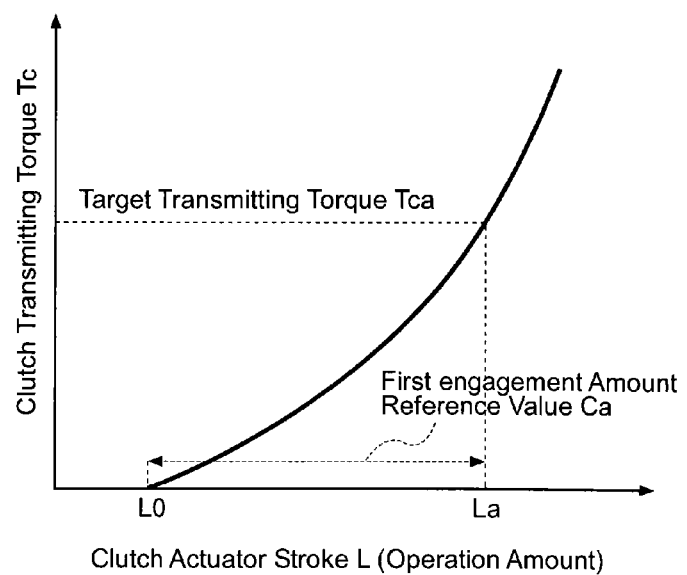
FIG. 4 is a graph showing the relationship between the transmitting torque of the first and the second clutches and a stroke of the actuator of the automatic clutch control apparatus according to the embodiment of the invention.

Next, the first reference value setting portion 5c obtains the target clutch stroke La corresponding to the target transmitting torque Tca based on the relationship between the transmitting torque Tc and the clutch stroke L shown in FIG. 4. Then the first reference value setting portion 5c obtains the first engagement amount reference value Ca which is the value of stroke difference between the target clutch stroke La and the clutch stroke L0 at the touch point position.

The second reference value setting portion 5d collects the information on the vehicle speed V calculated at the vehicle speed detecting portion 5a, the turning radius R calculated at the turning radius detecting portion 5b and the first engagement amount reference value Ca set at the first reference value setting portion 5c. The second reference value setting portion 5d defines the second engagement amount reference value Cb (=α·Ca) by multiplying the first engagement amount reference value Ca by clutch engagement ratio α. As shown in FIG. 7, after considering the driving preference of the operator of the vehicle, the relationship between the vehicle speed V per every turning radius and the clutch engagement ratio α is predetermined. Accordingly, the clutch engagement ratio α corresponding to a particular vehicle speed V and turning radius R can be obtained. This relationship will be later explained in detail.

The speed change control portion 5e receives the information on the first engagement amount reference value Ca set at the first reference value setting portion 5c and the second engagement amount reference value Cb set at the second reference value setting portion 5d. When the speed change operation is performed during the vehicle running straight forward, the speed change control portion 5e sends a command to the first and the second clutch actuators 3a and 3b to control the engagement amount C of the first and the second clutches 2a and 2b to be the first engagement amount reference value Ca. When the speed change operation is performed during the vehicle being turning, the speed change control portion 5e sends a command to the first and the second clutch actuators 3a and 3b to control the engagement amount C of the first and the second clutches 2a and 2b to be the second engagement amount reference value Cb.

Figure 5:
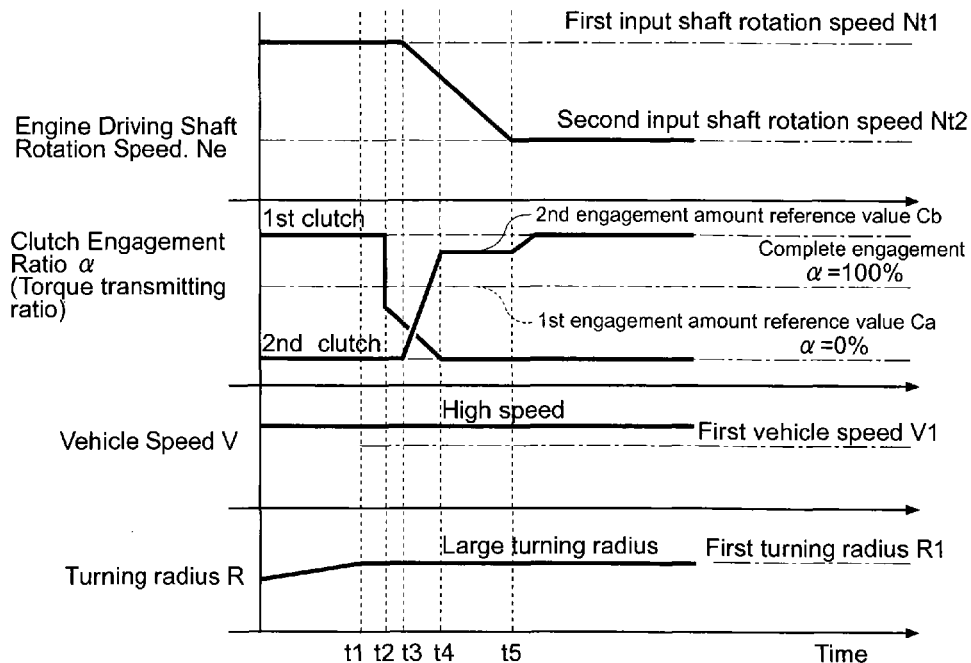
FIG. 5 is a time chart explaining the operation of the automatic clutch control apparatus according to the embodiment, showing the shift up operation during the vehicle turning at a high speed.
Figure 6:
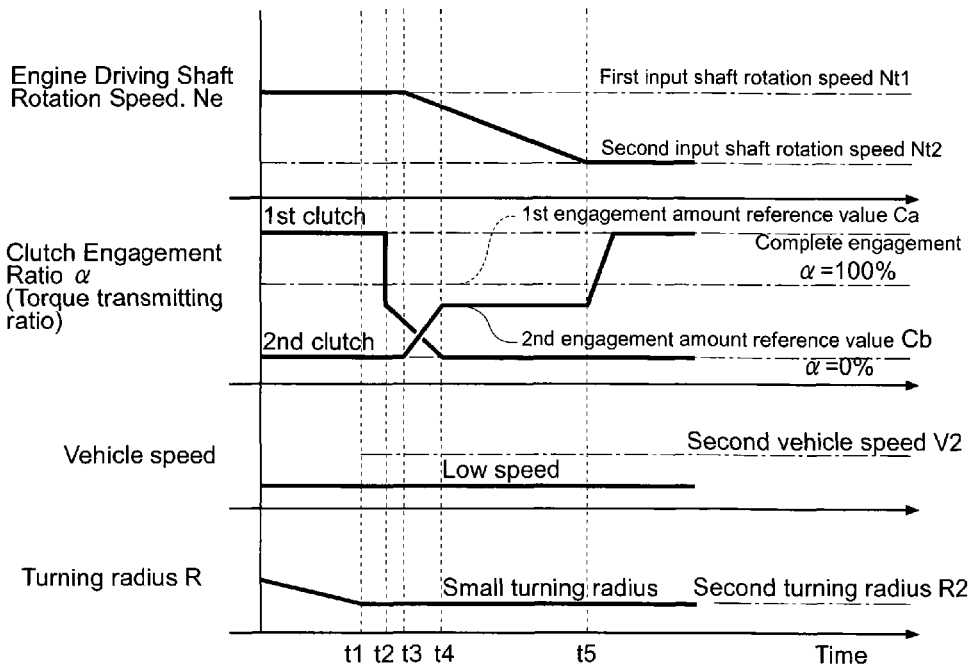
FIG. 6 is a time chart explaining the operation of the automatic clutch control apparatus according to the embodiment, showing the shift up operation during the vehicle turning at a low speed.

The controlling of the engagement amount C of the first and the second clutches 2a and 2b of the dual clutch 2 to the second engagement amount reference value Cb at the speed change operation during the vehicle being turning will be explained with reference to FIGS. 5 and 6. FIG. 5 and FIG. 6 show a time chart of operation of the automatic clutch apparatus 1 and FIG. 5 shows the shift-up operation condition at the vehicle turning with a high speed, while FIG. 6 shows the shift-up operation condition at the vehicle turning with a low speed.

Situation in FIG. 5 vehicle is running at high speed turning, it is assumed that sporty vehicle running condition that the vehicle is turning at a high vehicle speed V against turning radius R as winding. Under such driving condition, the operator of the vehicle wishes to have more direct feeling at the speed change operation than driving straight forward.

The vehicle running condition is mainly represented by the vehicle speed V and the turning radius and accordingly, a certain turning radius R is assumed to be the first turning radius R1 and the lower limit vehicle speed V which is judged to be the sporty vehicle running condition in the first turning radius R1 is assumed to be the first vehicle speed V1. Several combinations of the first turning radius R1 and the first vehicle speed V1 can be determined by a designer after several test running performances.

As shown in FIG. 5, the vehicle is turning with a constant vehicle speed V and as the time passes, the turning radius R becomes gradually larger and the turning radius R reaches to the first turning radius R1 at the time t1. At the time t1, the speed change control portion 5e of the TCU 5 issues a command to the first and the second gear wheel speed change mechanisms 30A and 30B and the dual clutch 2 to execute the shift-up operation.

At the time t1, when the vehicle speed V is equal to or more than the first vehicle speed V1 corresponding to the first turning radius R1, then the vehicle is judged to be the sporty vehicle running condition and is judged the operator of the vehicle desires to perform a speed change operation with a direct feeling. Accordingly, the second engagement amount reference value Cb is set to be a value more than the first engagement amount reference value Ca, with the assumption that the clutch engagement ratio α is more than 100%. At the time t2, the engagement of the first and the second clutches 2a and 2b begins.

At the time t2, the first clutch 2a under complete engagement, which has been transmitting the driving force from the engine 10 to the first input shaft 21 starts disengagement, and at the time t4, the first clutch 2a has been completely released, while the second clutch 2b begins engagement at the time t3 which is later than the time t2. At the time t4, the engagement amount C of the second clutch 2b becomes the second engagement amount reference value Cb. Thereafter, until the time t5 the engagement amount C of the second clutch 2b maintains the second engagement amount reference value Cb.

Until the time t3 when the second clutch 2b begins engagement, the rotation speed Ne of the driving shaft 11 of the engine 10 is the same with the rotation speed Nt1 of the first input shaft 21. Since the rotation of the output shaft 25 is transmitted to the second input shaft 22 under the second clutch 2b being disengaged, the rotation speed Nt2 of the second input shaft 22 is lower than the rotation speed of the first input shaft 21. The rotation speed Ne of the driving shaft 11 of the engine 10 is synchronized with the rotation speed Nt2 of the second input shaft 22 by the time t5 from the time t3. After the time t5, when the shift-up operation is completed, the second clutch 2b becomes under the complete engagement condition.

Thus explained, by controlling the engagement amount C of the second clutch 2b to the second engagement amount reference value Cb which is greater than the first engagement amount reference value Ca, the transmitting torque Tc of the clutch between the driving shaft 11 of the engine 10 and the second input shaft 22 of the automatic transmission apparatus 20 becomes greater than the target transmitting torque Tca and the operator of the vehicle will be satisfied with the transmitting torque Tc which the operator may be seeking for. Thus, the operator of the vehicle enjoys sporty direct feeling at the speed change operation during the vehicle being turning in the sporty vehicle running condition.

In FIG. 6, the condition that the vehicle is turning with a relatively low speed is assumed that the vehicle turns to the right or left with a relatively low speed which is unusually low speed for a vehicle with the turning radius the condition assumes that the operator of the vehicle drives cautiously when speed change is performed during the vehicle being turning. The operator of the vehicle requests the more smooth speed change operation compared to the condition of running straight forward.

As explained, the vehicle running condition is mainly represented by the vehicle speed V and the turning radius R and accordingly, a certain turning radius R is assumed to be the second turning radius R2 and the upper limit vehicle speed V2 which is judged to be the condition during a vehicle being turning is assumed to be the second vehicle speed V2. Several combinations of the second turning radius R2 and the second vehicle speed V2 can be determined by a designer after several test running performances.

As shown in FIG. 6, the vehicle is turning with a constant speed V the turning radius R becomes gradually smaller and the turning radius R reaches to the second turning radius R2 at the time t1. At the time t1, the speed change control portion 5e of the TCU 5 issues a command to the first and the second gear wheel speed change mechanisms 30A and 30B of the automatic transmission apparatus 20 and the dual clutch 2 to execute the shift-up operation.

At the time t1, when the vehicle speed V is less than the second vehicle speed V2 corresponding to the second turning radius R2, then the vehicle is judged to be a cautious vehicle running condition and is judged the operator of the vehicle desires to perform a smooth speed change operation. Accordingly, the second engagement amount reference value Cb is set to be a value less than the first engagement amount reference value Ca, with the assumption that the clutch engagement ratio α is less than 100%. At the time t2, the engagement of the first and the second clutches 2a and 2b begins.

The operation of the first and the second clutches 2a and 2b changing performance and the synchronizing of the rotation of the driving shaft 11 of the engine 10 are same as those explained with reference to FIG. 5 and explanation thereof is omitted.

Thus explained, by controlling the engagement amount C of the second clutch 2b to the second engagement amount reference value Cb which is smaller than the first engagement amount reference value Ca, the transmitting torque Tc of the clutch between the driving shaft 11 of the engine 10 and the second input shaft 22 of the automatic transmission apparatus 20 becomes smaller than the target transmitting torque Tca and the operator of the vehicle will be satisfied with the transmitting torque Tc which the operator may be seeking for. Thus, the operator of the vehicle enjoys smooth shifting feeling at the speed change operation during the cautious vehicle being turning.

FIG. 7 shows an example of the relationship for setting the second engagement amount reference value Cb in the automatic clutch control apparatus 1 and shows the relationship between the vehicle speed V per every turning radius R and the clutch engagement ratio α (=Cb/Ca). The one dotted chain line in FIG. 7 indicates the clutch engagement ratio α at the speed change operation during the vehicle running straight forward. The ratio is constantly 100% regardless of the magnitude of the vehicle speed V. As shown in FIG. 7, when the relationship among the turning radius R is R1, R2 and R3 is "R1<R2<R3", the setting of the second engagement amount Cb will be explained hereinafter.

When the turning radius R is the smaller value R1, operator of the vehicle may require a smooth speed change operation, but does not require a direct feeling speed change operation. Under this situation, the turning radius R1 corresponds to the second turning radius according to the invention and therefore, the second vehicle speed $V2_1$ corresponding to the turning radius R1 is defined. When the vehicle speed V is less than the second vehicle speed $V2_1$, the clutch engagement ratio α is proportional to the vehicle speed V and the ratio α is less than 100%, but when the vehicle speed V is equal to or greater than the second vehicle speed $V2_1$, the clutch engagement ratio α is equal to 100%.

When the turning radius R is the larger value R3, operator of the vehicle may require a direct feeling speed change operation, but does not require a smooth speed change operation. Under this situation, the turning radius R3 corresponds to the first turning radius according to the invention and therefore, the first vehicle speed $V1_3$ corresponding to the turning radius R3 is defined. When the vehicle speed V is equal to or more than the first vehicle speed $V1_3$, the clutch engagement ratio α is proportional to the vehicle speed V and the ratio α is more than 100%, but when the vehicle speed V is equal to or less than the first vehicle speed $V1_3$, the clutch engagement ratio α is equal to 100%.

When the turning radius R is the value R2 between the values R1 and R3, the operator of the vehicle either requires a direct feeling speed change operation or a smooth speed change operation depending on the vehicle speed V. The turning radius R2 of this case corresponds to both first turning radius and second turning radius according to the invention. When the vehicle speed V is equal to or more than the first vehicle speed $V1_2$, the clutch engagement ratio α is proportional to the vehicle speed and the ratio α is more than 100. However, when the vehicle speed V is less than the second vehicle speed $V2_2$, the ratio α is proportional to the vehicle sped V and is less than 100%. When the vehicle speed V is equal to or more than the second vehicle speed $V2_2$ and less than the first vehicle speed $V1_2$, the clutch engagement ratio α is equal to 100%.

FIG. 8 shows the flowchart for setting the second engagement amount reference value Cb in the automatic clutch control apparatus 1. This flowchart assumes that the operator of the vehicle requires either the direct feeling speed change operation or the smooth speed change operation depending on the vehicle speed V as like the case when the turning radius R corresponds to the turning radius R2.

The flowchart in FIG. 8 starts at "shift command setting start" and ends at "shift command setting completed". In other words, the program is executed in a moment at the time t1 shown in FIGS. 5 and 6. After the flowchart is started, at the step S1, the vehicle speed V and the turning radius R are detected and at the same time the first engagement amount reference value Ca which corresponds to the clutch engagement amount C is determined. The target transmitting torque Tca is obtained by the first engagement amount reference value Ca according to the procedure above. At step S2, from the relationship shown in FIG. 7 for setting the second engagement amount reference value Cb, the relationship between the clutch engagement ratio α and the vehicle speed V corresponding to the detected turning radius R (including both first and second turning radii) is selected.

At step S3, when the vehicle speed V is equal to or more than the first vehicle speed V1 corresponding to the turning radius R, the clutch engagement ratio α is set to be larger than 100% (α>100%) at the next step S4. When the vehicle speed V is less than the first vehicle speed V1, the program goes to the step S5. At the step S5, when the vehicle speed V corresponding to the turning radius R is less than the second vehicle speed V2, the clutch engagement ratio α is set to be smaller than 100% (α<100%) at the next step S6. At the step S5, if the vehicle speed V is equal to or more than the second vehicle speed V2, the program goes to the step S7 to set the clutch engagement ratio α to be equal to 100%.

After the clutch engagement ratio α is set to either one at the step S4, S6 or S7, at step S8, the second engagement amount reference value Cb (=α·Ca) by multiplying the first engagement amount reference value Ca by the clutch engagement ratio α and then the program goes to end.

According to the embodiment of the invention, the automatic clutch control apparatus 1 includes a first reference value setting portion 5c for setting a first engagement amount reference value Ca of the first and the second clutches 2a and 2b to obtain a target transmitting torque Tca by calculating a target inertia torque "Ie·ΔNea" by multiplying a target rotation speed change rate ΔNea of the engine 10 at a speed change operation by an inertia "Ie" of the engine 10 and subtracting the target inertia torque "Ie·ΔNea" from the current output torque Te of the engine 10 to be the target transmitting torque Tca of the first and the second clutches 2a and 2b and a second reference value setting portion 5d for setting a second engagement amount reference value Cb by correcting the first engagement amount reference value Ca based on the vehicle speed V and the turning radius R.

The automatic clutch control apparatus 1 further controls the engagement amount C of the first and the second clutches 2a and 2b to be the first engagement amount reference value Ca when the speed change operation is performed under the vehicle being running straight forward and controls the engagement amount C of the first and the second clutches 2a and 2b to be the second engagement amount reference value Cb when the speed change operation is performed under the vehicle being turning.

Driving preference of an operator of the vehicle during the vehicle turning can be presumed from mainly the vehicle speed V and the turning radius R of the vehicle. Accordingly, according to the embodiment of the invention, it is possible to perform a speed change operation with a good feeling that can satisfy the preference of the operator of the vehicle when such speed change operation is performed during the vehicle being turning by controlling the clutch engagement amount C at the speed change operation to the second engagement amount reference value Cb which is set based on the vehicle speed V and the turning radius R of the vehicle.

According to the embodiment, when the second engagement amount reference value Cb is calculated by multiplying the first engagement amount reference value Ca by the clutch engagement ratio α, as shown in FIG. 7 and FIG. 8, in a certain turning radius R (R2 in FIG. 7) if the vehicle speed V is equal to or more than the first vehicle speed V1 the clutch engagement ratio α is set to be more than 100% (α>100%) and if the vehicle speed V is less than the second vehicle speed V2, the clutch engagement ratio α is set to be less than 100% (α≧100%) and further if the vehicle speed V is equal to or more than the second vehicle speed V2 and less than the first vehicle speed V1, the engagement ratio α is set to be 100%.

Accordingly, it is possible to satisfy the operator of the vehicle to give either a smooth speed change operation or give a direct feeling speed change operation depending on the vehicle turning condition.

According to the embodiment of the invention, the automatic clutch control apparatus 1 can be applied to the dual clutch type automatic transmission apparatus 20. Since the dual clutch type automatic transmission apparatus 20 is provided with gear trains forming a plurality of speeds to be changed waiting with idle rotation for a speed change operation to come. Upon issuance of a speed change command, the first and the second clutches 2a and 2b are switched over the engagement or the disengagement to complete the speed change operation. The time necessary for the speed change operation is very short and the speed change shock is very small. Accordingly, by applying the dual clutch type automatic transmission apparatus 20 to the automatic clutch control apparatus 1, the effect of the dual clutch type automatic transmission apparatus 20 is synergized with the effect of automatic clutch control apparatus 1 which can provide a further better feeling to the operator of the vehicle.

As mentioned, the automatic clutch control apparatus 1 includes the clutch 2 disposed between the driving shaft 11 of the prime mover 10 of the vehicle and the input shaft 21,22 of the transmission mechanism 20, the clutch actuator 3a,3b for controlling the engagement/disengagement operation and the engagement amount of the clutch, the vehicle speed detecting means 4FL,4FR,4RL,4RR for detecting the vehicle speed V of the vehicle, a turning radius detecting means 4FL,4FR, 4RL,4RR for detecting the turning radius R of the vehicle, the first reference value setting portion 5c for setting a first engagement amount reference value Ca of the clutch 2 to obtain the target transmitting torque Tca by calculating the target inertia torque by multiplying the inertia of the prime mover by the target rotation speed change rate of the prime mover at a speed change operation and subtracting the target inertia torque from the current output torque of the prime mover, the value obtained being calculated to be the target transmitting torque Tca of the clutch 2, a second reference value setting portion 5d for setting a second engagement amount reference value Cb by correcting the first engagement amount reference value Ca based on the vehicle speed V and the turning radius R and a speed change control portion 5e for issuing the command to the clutch actuator 3a,3b to control the engagement amount of the clutch to set to the first engagement amount reference value Ca when the speed change operation is performed under the vehicle being running straight forward and for issuing the command to the clutch actuator 3a,3b to control the engagement amount of the clutch 2 to set to the second engagement amount reference value Cb when the speed change operation is performed under the vehicle being turning.

Since the automatic clutch control apparatus 1 is provided with the first reference value setting portion 5c for setting the first engagement amount reference value Ca of the clutch 2 to obtain the target transmitting torque Tca by calculating the target inertia torque by multiplying the inertia of the engine by the target rotation speed change rate of the engine at the speed change operation and subtracting the target inertia torque from the current output torque of the engine to be the target transmitting torque of the clutch and the second reference value setting portion 5d for setting the second engagement amount reference value Cb by correcting the first engagement amount reference value Ca based on the vehicle speed V and the turning radius R, the clutch engagement amount at the speed change operation under the vehicle running straight forward is controlled to be the first engagement amount reference value Ca and at the same time the clutch engagement amount at a speed change operation under the vehicle being turning is controlled to be the second engagement amount reference value Cb.

The word "inertia" of the engine 10 (or prime mover) means the moment of inertia or the moment of inertia ratio. The phrase "target inertia torque" corresponds to the deceleration or acceleration torque to be transmitted to the driving shaft 11 from the clutch 2 to change the rotation speed (decelerate or accelerate) of the engine 10. The phrase "current output torque" of the engine 10 is obtained for example, by calculation based on the rotation speed of the driving shaft 11 of the engine 10, various detected values, such as a throttle opening degree and output torque performance of the engine.

Further, the phrase "target rotation speed change rate" means a well-known target value predetermined in advance as the speed change rate of the driving shaft 11 of the engine 10 when the transmission apparatus 20 is shifted in a certain speed (gear shift). Shocks normally generated at the time of speed change operation (gear shifting operation) can be minimized and the speed change operation can be promptly completed by controlling the speed change operation so that the change ratio of the rotation speed of the engine driving shaft 11 can be the target rotation speed change rate.

Driving preference of the driver of the vehicle during the vehicle being turning can be assumed from mainly the vehicle speed V and the turning radius R of the vehicle. Accordingly, it is possible to perform a speed change operation with the good feeling that can satisfy the preference of the operator of the vehicle when such speed change operation is performed during the vehicle being turning, by controlling the clutch engagement amount at the speed change operation during the vehicle turning to be the second engagement amount reference value Cb set based on the vehicle speed V and the turning radius R of the vehicle.

It is noted that the second engagement amount reference value Cb can be set based on the vehicle turning condition to consider the preference of the operator of the vehicle. However, depending on the turning condition of the vehicle, it may be possible to obtain the good feeling to satisfy the preference of the operator by agreeing the second engagement amount reference value Cb to the first engagement amount reference value Ca (equalizing to the first engagement amount reference value Ca). Therefore, for example, when the second engagement amount reference value Cb is determined by multiplying the first engagement amount reference value Ca by the clutch engagement ratio, the clutch engagement ratio may include the value 100(%) in addition to the value more than 100 or the value less than 100. This means the second engagement amount reference value Cb includes the equal value to the first engagement amount reference value Ca.

As explained above, the automatic clutch control apparatus 1 can be provided which can obtain the good feeling to an operator of the vehicle in response to operator's driving preference when the speed change operation is carried out under the vehicle being turning.

Further, the automatic clutch control apparatus 1 includes the second reference value setting portion 5d wherein the second engagement amount reference value Cb is set to be larger than the first engagement amount reference value Ca when the turning radius R is detected to be the first turning radius R1 and the vehicle speed V is detected to be equal to or more than the first vehicle speed V1 which is set according to the first turning radius R1.

Accordingly, the second reference value setting portion 5d sets the second engagement amount reference value Cb to be greater than the first engagement amount reference value Ca when the turning radius R of the vehicle is the first turning radius R1 and the vehicle speed V equals to the first vehicle speed V1 which is determined depending on the first turning radius R1.

The "first turning radius R1" is not intended to one (a fixed value) turning radius and any randomly selected turning radius value is included. The "first vehicle speed V1" is the fixed vehicle speed defined corresponding to the value of the first turning radius R1 and accordingly, a plurality of combinations of first turning radius R1 and first vehicle speed V1 can be provided.

The case that the vehicle speed V is equal to or more than the first vehicle speed V1 which is determined corresponding to the first turning radius R1 is assumed to be the sporty vehicle running condition where the vehicle is turning against the first turning radius R1 at higher speed than the first vehicle speed V1 such as winding. Under such vehicle running condition, the operator of the vehicle desires to have the more direct feeling at a speed change operation as compared to the vehicle running straight forward.

The more direct feeling can be obtained at the speed change operation by setting the second engagement amount reference value Cb of the clutch 2 to be greater than the first engagement amount reference value Ca and the good feeling which satisfies the preference of the operator can be obtained depending on the vehicle running condition when the speed of the transmission mechanism 20 is shifted to another speed during the vehicle making the turn.

Further, the automatic clutch control apparatus 1 includes the second reference value setting portion 5d which sets the second engagement amount reference value Cb to be less than the first engagement amount reference value Ca when the turning radius R is the second turning radius R2 and the vehicle speed V is less than the second vehicle speed V2 which is set according to the second turning radius R2.

It is noted here that the "second turning radius R2" is not intended to one (a fixed) turning radius, but any randomly selected turning radius is included in this definition. It is also noted that the "second vehicle speed V2" is one (a fixed one) vehicle speed which is determined corresponding to the second turning radius R2. Accordingly, a plurality of combinations of the second turning radius R2 and the second vehicle speed V2 is determined.

"The vehicle speed V is less than the second vehicle speed V2 which is determined corresponding to the second turning radius R2" is assumed to be the case where the operator of the vehicle drives the vehicle cautiously despite of the vehicle with a large turning radius at a low speed during the vehicle making the turn to the right or left with the vehicle. Under such vehicle running condition, operators of the vehicle desire to have the more smooth speed change operation than under the vehicle condition of straight forward running.

Accordingly, it is possible to obtain the good feeling which satisfies the preference of the operator of the vehicle depending on the vehicle turning condition by giving the smooth speed change operation, even when the transmission mechanism 20 is speed shifted during the vehicle being turning by setting the second engagement amount reference value Cb to be less than the first engagement amount reference value Ca.

Further, the transmission mechanism 20 of the automatic clutch control apparatus 1 includes the first input shaft 21 and the second input shaft 22 arranged co-centric with the first input shaft 21, the first shift mechanism 30A1 for establishing the odd number speed by changing the rotation speed of the engine 10 which is transmitted to the first input shaft 21 and a second shift mechanism 30A2 for establishing an even number speed by changing the rotation speed of the engine transmitted to the second input shaft 22, wherein the clutch includes a dual type clutch 2 having a first clutch 2a for transmitting a driving rotation force from the engine 10 to the first input shaft 21 and a second clutch 2b for transmitting the driving rotation force from the engine 10 to the second input shaft 22 and wherein upon an issuance of speed change command, the speed change control portion 5e performs the clutch disengaging operation for disengaging one of the first and the second clutches 2a,2b corresponding to one of the first and the second input shafts 21,22 which is disconnected from the driving shaft 11 and at the same time performs the clutch engaging operation for engaging the other of the first and the second clutches 2a,2b corresponding to the other of the first and the second input shafts 21,22 which is connected to the driving shaft 11 keeping the transmission apparatus 20 being under speed change operation.

Accordingly, the automatic clutch control apparatus 1 can be applied to the dual clutch type transmission apparatus. Since the dual clutch type automatic transmission apparatus is provided with gear trains forming the plurality of speeds to be changed waiting with idle rotation for the speed change operation to come. Upon issuance of the speed change command, the two clutches 2a,2b are switched over the engagement or the disengagement to complete the speed change operation. The time necessary for the speed change operation is very short and the speed change shock is very small. Accordingly, by applying the dual clutch type automatic transmission apparatus to the automatic clutch control apparatus, it is possible to obtain the further better feeling to the operator of the vehicle.

The automatic clutch control apparatus 1 is not limited to the structure and operation explained in the above embodiments, but the improvements and alternations thereof are included within the invention as far as such are within the subject matter of the invention.

For example, the relationship map illustrated in FIG. 7 is one of the examples of the invention for setting the second engagement amount reference value Cb and is not limited thereto. Further, in FIG. 7, the clutch engagement ratio α is proportional to the vehicle speed V in a straight line, but is not limited thereto. Any relationship, such as proportional to the vehicle speed V in a curved line for setting the reference value Cb may be within the scope of the invention. Further, instead of using the graph in FIG. 7, a map defining the clutch engagement ratio α per vehicle speed V stepwise can be applied to set the reference value Cb.

In FIG. 7, when the turning radius R is the turning radius R2 and the vehicle speed V is equal to or more than the second vehicle speed $V2_2$ and less than the first vehicle speed $V1_2$, the clutch engagement ratio α is 100% to equalize the values of the first engagement amount reference value Ca and the second engagement amount reference value Cb. However, it is possible to equalize the values of the first and the second vehicle speeds $V1_2$ and $V2_2$ and no zone is set where the first engagement amount reference value Ca and the second engagement amount reference value Cb are equal values.

According to the embodiment, the turning radius R is calculated based on the difference in wheel speed between the wheel speed VRL of the rear left wheel TRL and the wheel speed VRR of the rear right wheel TRR. However, the calculation is not limited to this method, but any other sensor which is associated with a turning radius for example, steering sensor or the yaw rate sensor may be used to calculate the turning radius R. further, the turning radius can be obtained by a lateral acceleration, image taken by a camera, road information or the present position obtained by in-vehicle navigation system.

According to the embodiment of the invention, a shift-up operation of the automatic transmission apparatus 20 has been explained during the vehicle turning, however, a shift-down operation of the automatic transmission apparatus 20 can be used to obtain the same effects as the embodiment.

According to the embodiment, an automatic clutch control apparatus 1 is installed in the vehicle with FF (Front Engine, Front Drive) type engine, but the automatic clutch control apparatus 1 can be installed in a vehicle with FR (Front Engine, Rear Drive) type engine.

According to the embodiment, the automatic clutch control apparatus 1 is applied to the dual clutch type automatic transmission apparatus 20 (DCT), but this can be applied to any other type, such as automated manual transmission (AMT), for example disclosed in a JP Patent publication (JP 2008-75814 A). Further, the automatic clutch control apparatus 1 can be applied also to a conventional manual transmission with automatic clutch operation.

What we claim is:

1. An automatic clutch control apparatus comprising:
a clutch disposed between a driving shaft of a prime mover of a vehicle and an input shaft of a transmission mechanism;
a clutch actuator for controlling an engagement/disengagement operation and an engagement amount of the clutch;
a vehicle speed detecting means for detecting a vehicle speed of the vehicle;
a turning radius detecting means for detecting a turning radius of the vehicle;
a first reference value setting portion for setting a first engagement amount reference value of the clutch to obtain a target transmitting torque by calculating a target inertia torque by multiplying an inertia of the prime mover by a target rotation speed change rate of the prime mover at a speed change operation and subtracting a target inertia torque from a current output torque of the prime mover, the value obtained being calculated to be the target transmitting torque of the clutch;
a second reference value setting portion for setting a second engagement amount reference value by correcting the first engagement amount reference value based on the vehicle speed and the turning radius; and
a speed change control portion for issuing a command to the clutch actuator to control the engagement amount of the clutch to set to the first engagement amount reference value when the speed change operation is performed under the vehicle being running straight forward and issuing a command to the clutch actuator to control the engagement amount of the clutch to set to the second engagement amount reference value when the speed change operation is performed under the vehicle being turning.

2. The automatic clutch control apparatus according to claim 1, wherein the second reference value setting portion sets the second engagement amount reference value to be greater than the first engagement amount reference value when the turning radius is a first turning radius and the vehicle speed is equal to or more than a first vehicle speed which is set according to the first turning radius.

3. The automatic clutch control apparatus according to claim 1, wherein the second reference value setting portion sets the second engagement amount reference value to be less than the first engagement amount reference value when the turning radius is a second turning radius and the vehicle speed is less than a second vehicle speed which is set according to the second turning radius.

4. The automatic clutch control apparatus according to claim 1, wherein the transmission mechanism includes a first input shaft and a second input shaft co-centrically arranged with the first input shaft, a first shift mechanism for establishing odd number speeds by changing a rotation speed of the prime mover transmitted to the first input shaft and a second shift mechanism for establishing even number speeds by changing the rotation speed transmitted to the second input shaft,
the clutch includes a dual clutch having a first clutch for transmitting a rotation driving force of the prime mover to the first input shaft and a second clutch for transmitting the rotation driving force to the second input shaft, and wherein,
the speed change control portion, upon an issuance of speed change command, controls a clutch disengaging operation for disengaging one of the first and the second clutches corresponding to one of the first and the second input shafts which is to be disconnected from the driving shaft and at the same time controls a clutch engaging operation for engaging the other of the first and the second clutches corresponding to the other of the first and the second input shafts which is to be connected to the driving shaft, keeping the transmission mechanism being under the speed change operation.

* * * * *